(12) United States Patent
Reckers et al.

(10) Patent No.: US 11,424,466 B2
(45) Date of Patent: Aug. 23, 2022

(54) MEMBRANE ELECTRODE UNIT WITH A SEAL ARRANGEMENT, FUEL CELL, AND FUEL CELL STACK

(71) Applicants: AUDI AG, Ingolstadt (DE); VOLKSWAGEN AG, Wolfsburg (DE)

(72) Inventors: Matthias Reckers, Braunschweig (DE); Hannes Scholz, Braunschweig (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 16/642,328

(22) PCT Filed: Aug. 17, 2018

(86) PCT No.: PCT/EP2018/072326
§ 371 (c)(1),
(2) Date: Feb. 3, 2021

(87) PCT Pub. No.: WO2019/042794
PCT Pub. Date: Mar. 7, 2019

(65) Prior Publication Data
US 2021/0159527 A1    May 27, 2021

(30) Foreign Application Priority Data
Aug. 28, 2017 (DE) .................... 10 2017 214 983.3

(51) Int. Cl.
*H01M 8/0276* (2016.01)
*H01M 8/1004* (2016.01)
(Continued)

(52) U.S. Cl.
CPC ....... *H01M 8/1004* (2013.01); *H01M 8/0284* (2013.01); *H01M 8/0276* (2013.01); *H01M 2008/1095* (2013.01); *H01M 2250/20* (2013.01)

(58) Field of Classification Search
CPC ............ H01M 8/1004; H01M 8/0284; H01M 8/0276; H01M 8/10; H01M 8/0271;
(Continued)

(56) References Cited

U.S. PATENT DOCUMENTS

| 6,716,550 B1 * | 4/2004 | Kirby ................. H01M 8/0271 429/509 |
| 9,240,598 B2 | 1/2016 | Martin et al. |

(Continued)

FOREIGN PATENT DOCUMENTS

| CN | 105702987 A | 6/2016 |
| DE | 10 2013 014 083 A1 | 3/2015 |

(Continued)

OTHER PUBLICATIONS

International Search Report and Written Opinion for International Application No. PCT/EP2018/072326; dated Nov. 19, 2018; 18 pages.

*Primary Examiner* — Haixia Zhang
(74) *Attorney, Agent, or Firm* — Seed IP Law Group LLP

(57) ABSTRACT

A membrane electrode unit has a seal arranged on the edge region, wherein the seal in part penetrates into the edge region of the membrane electrode unit and in part fully covers the edge region outside the membrane electrode unit, which enables sealing of the gas chambers of a fuel cell and at the same time reliably interrupts a leakage path at the edge in membrane electrode units with flush cut. The membrane electrode unit is surrounded by a sealing frame which at least partially surrounds the edge region with the seal.

11 Claims, 3 Drawing Sheets

(51) Int. Cl.
*H01M 8/0284* (2016.01)
*H01M 8/10* (2016.01)

(58) Field of Classification Search
CPC .. H01M 8/0273; H01M 8/028; H01M 8/0286; H01M 8/242; H01M 8/0289; H01M 8/2425; H01M 8/244; H01M 2008/1095; H01M 2250/20
See application file for complete search history.

(56) References Cited

U.S. PATENT DOCUMENTS

| | | |
|---|---|---|
| 2004/0091767 A1 | 5/2004 | Zuber et al. |
| 2004/0191604 A1 | 9/2004 | Artibise et al. |
| 2007/0003821 A1* | 1/2007 | Belchuk ............... H01M 8/0286 429/465 |
| 2007/0072045 A1* | 3/2007 | Haufe ................ H01M 8/0273 429/457 |
| 2007/0298302 A1 | 12/2007 | Oschmann |
| 2008/0118811 A1 | 5/2008 | Okabe |
| 2009/0004543 A1 | 1/2009 | Jung et al. |
| 2009/0220834 A1 | 9/2009 | Schaacke et al. |
| 2012/0034542 A1* | 2/2012 | Martin ................ H01M 8/0284 429/457 |
| 2013/0252133 A1* | 9/2013 | Yoshida ............. H01M 8/0258 429/482 |
| 2016/0181630 A1 | 6/2016 | Bauer et al. |
| 2017/0317373 A1 | 11/2017 | Stahl et al. |

FOREIGN PATENT DOCUMENTS

| | | |
|---|---|---|
| DE | 10 2015 100 740 A1 | 7/2016 |
| EP | 1 246 281 A1 | 10/2002 |
| EP | 1 403 949 A1 | 3/2004 |
| EP | 1 671 388 | 6/2006 |
| EP | 1 906 476 A1 | 4/2008 |
| EP | 1 906 476 B1 | 4/2008 |
| EP | 2 371 020 B1 | 6/2016 |
| EP | 1 671 388 B1 | 7/2016 |
| WO | 2005/029620 A1 | 3/2005 |
| WO | 2007/022464 A2 | 2/2007 |

* cited by examiner

MEMBRANE ELECTRODE UNIT WITH A SEAL ARRANGEMENT, FUEL CELL, AND FUEL CELL STACK

BACKGROUND

Technical Field

Embodiments of the invention relate to a membrane electrode unit having a seal arranged on the edge region, wherein the seal in part penetrates into the edge region of the membrane electrode unit and in part fully covers the edge region outside the membrane electrode unit, and to a fuel cell and a fuel-cell stack.

Description of the Related Art

Fuel cells use the chemical conversion of a fuel with oxygen into water in order to generate electrical energy. For this purpose, fuel cells contain as core component the so-called membrane electrode unit (MEA, membrane electrode assembly), which is a combination of an ion-conducting, in particular a proton-conducting, membrane and an electrode (anode or cathode) arranged on each side of the membrane. Additionally, gas diffusion layers (GDLs) are arranged on both sides of the membrane electrode unit on the sides of the electrodes facing away from the membrane. Usually, the fuel cell is formed by a plurality of MEAS that are arranged in a stack and whose electrical powers add up. During operation of the fuel cell, the fuel, in particular hydrogen $H_2$, or a gas mixture containing hydrogen is guided to the anode, where an electrochemical oxidation of $H_2$ to $H^+$ with loss of electrons takes place. A (water-bound or water-free) transport of the $H^+$ protons from the anode chamber into the cathode chamber is effected via the electrolytes or the membrane, which separates the reaction chambers from each other in a gas-tight manner and electrically insulates them. The electrons provided at the anode are guided to the cathode via an electrical line. The cathode receives oxygen or a gas mixture containing oxygen so that a reduction of $O_2$ to $O^{2-}$ with gain of electrons takes place. At the same time, those oxygen anions react in the cathode chamber with the protons transported via the membrane while forming water. As a result of the direct conversion of chemical into electrical energy, fuel cells have improved efficiency compared to other electricity generators because the Carnot factor is avoided.

The fuel cell is formed by a plurality of individual cells arranged in the stack, which is why this is also called a fuel-cell stack. Between the membrane electrode units are arranged bipolar plates, which ensure that the individual cells are supplied with the operating media, i.e., the reactants and a coolant. In addition, the bipolar plates ensure an electrically conductive contact to the membrane electrode units.

Seals are arranged between the membrane electrode units and the bipolar plates, said seals sealing the anode and cathode chambers toward the outside and preventing the operating media from escaping from the fuel cell.

The seals can be provided on the part of the membrane electrode units or of the bipolar plates and, in particular, be connected to these components.

EP 1 906 476 A1 discloses a sealing structure for a fuel cell and a method for the production thereof, which is formed in one piece on the edge of a membrane electrode unit and forms sealing lips which effect a seal with respect to the separator plates. In addition, the membrane protruding from the MEA is integrated into the sealing structure. When the sealing structure is produced, an edge region of the MEA is impregnated with the sealing material.

WO 2007/022464 A2 describes a sealing structure for a fuel cell which is arranged on a straight cutting edge of the membrane electrode unit and surrounds it. The sealing structure can have different profiles which bear against the separators and provide gas-tight spaces.

US 2007/0003821 A1 relates to a seal cast in one piece for sealing against the separators for a fuel cell, in which the membrane of the membrane electrode unit is incorporated into the seal. The sealing material penetrates into the membrane electrode unit only slightly in the surface region.

BRIEF SUMMARY

Embodiments of the invention provide a membrane electrode unit with a seal arrangement which enables a sealing of the gas chambers of a fuel cell and at the same time reliably interrupts a leakage path at the cutting edge in membrane electrode units with flush cut.

A membrane electrode unit may be provided with a seal arranged on the edge region, wherein the seal in part penetrates into the edge region of the membrane electrode unit and in part fully covers the edge region outside the membrane electrode unit, and wherein the membrane electrode unit is surrounded by a sealing frame which at least partially surrounds the edge region with the seal.

In the context of the application, "membrane electrode unit" is understood to mean the composite of an ion-conducting, in particular proton-conducting, membrane and an electrode (anode or cathode) arranged on each side of the membrane and gas diffusion layers (GDLs) arranged on both sides.

"Sealing frame" means that it is also equipped with a sealing function. For this purpose, the sealing frame itself can consist of a sealing (elastic) material and/or can be provided with at least one seal, wherein the at least one seal may be arranged on both sides of the sealing frame in each case.

The edge of the membrane electrode unit is formed during the separation of material present on rolls by means of flush cut so that all layers of the membrane electrode unit are dimensioned identically.

Two sealing functions can thus be combined in the membrane electrode unit described herein. On the one hand, the seal at the edge region of the MEA seals the anode gas chamber against the cathode gas chamber (internal seal), and, on the other hand, the anode gas chamber and the cathode gas chamber are sealed against the environment (external seal). With the internal seal, the exchange of reaction gas across the edge of the MEA is prevented.

By providing the two sealing functions using different components, the MEA can be processed and separated as a roll material and subsequently be used in any single cell concepts due to the sealing frame.

The sealing compound can penetrate into the MEA or the GDL by 0.1 to 1 mm, such as 0.2 to 0.7 mm, 0.4 to 0.6 mm, or 0.5 mm, so that leaks can be reliably avoided. At the same time, only a small proportion of the MEA or of the active area becomes functionless due to the seal. The penetration depth can be varied by adjusting the viscosity of the unhardened sealing material.

The seal may cover not only the edge region of the membrane electrode unit but also a part of the top and bottom side of the MEA in order to further reduce the risk of leakage of the seal. The extension on the top and bottom side should of course be as low as possible. The dimensioning may correspond to the penetration depth described above.

According to an embodiment of the membrane electrode unit, the sealing frame is formed in one piece. This means that the sealing frame may have an angular or L-shaped cross-sectional profile. The membrane electrode unit is inserted and optionally fixed into such a sealing frame, which can be prefabricated.

Another embodiment represents another type of fixing. In this case, the aforementioned one-piece sealing frame is closed after insertion with a corresponding frame part on the side from which the membrane electrode unit is inserted. The sealing frame is accordingly designed to be two-pieced.

In another two-piece embodiment of the sealing frame, two equally shaped frame parts are glued together, welded, or the like. The two frame parts may each consist of plastic films, such as polyethylene terephthalate (PET) or polyethylene naphthalate (PEN) film.

In all embodiments, the sealing frame can also have a circumferential edge which extends away from the MEA in the plane of the MEA. The edge improves the handling and stability of the membrane electrode unit. At least one seal can be applied to the circumferential edge. The at least one seal may be provided on both sides of the sealing frame.

The design and arrangement of the seal can easily be adapted to the respective circumstances. Two or more seals can thus also be arranged one behind the other on the respective sides of the membrane electrode unit.

The sealing frame and its components may be made of a polymer. Suitable polymers are basically known to the person skilled in the art from the prior art. If the sealing frame itself is to have a sealing effect, it may be made of a silicone.

The seal may be made of a polymeric material whose monomer has such a low viscosity that penetration along the edge into the MEA is made possible so that no gap can result between MEA and seal and the porous GDL is also closed on both sides, i.e., the porosity in the edge region can be reduced to zero. Suitable polymers are generally known to the person skilled in the art from the prior art, wherein silicones may be used.

Embodiments of the invention further relate to a fuel-cell stack having a plurality of membrane electrode units as described herein, which are alternately layered with bipolar plates.

On the side facing the membrane electrode unit, the bipolar plates can also each have at least one seal which corresponds to the sealing frame or its components.

Further embodiments of the invention relate to a fuel-cell system having a fuel-cell stack as described herein and to a vehicle having a fuel-cell system with a fuel-cell stack as described herein. The vehicle may be an electric vehicle in which electrical energy generated by the fuel-cell system serves to supply an electric traction motor and/or a traction battery.

The various embodiments of the invention mentioned herein may be combined with each other unless stated otherwise in individual cases.

BRIEF DESCRIPTION OF THE SEVERAL VIEWS OF THE DRAWINGS

Embodiments of the invention are explained below with reference to the respective drawings.

DETAILED DESCRIPTION

Figure 1:
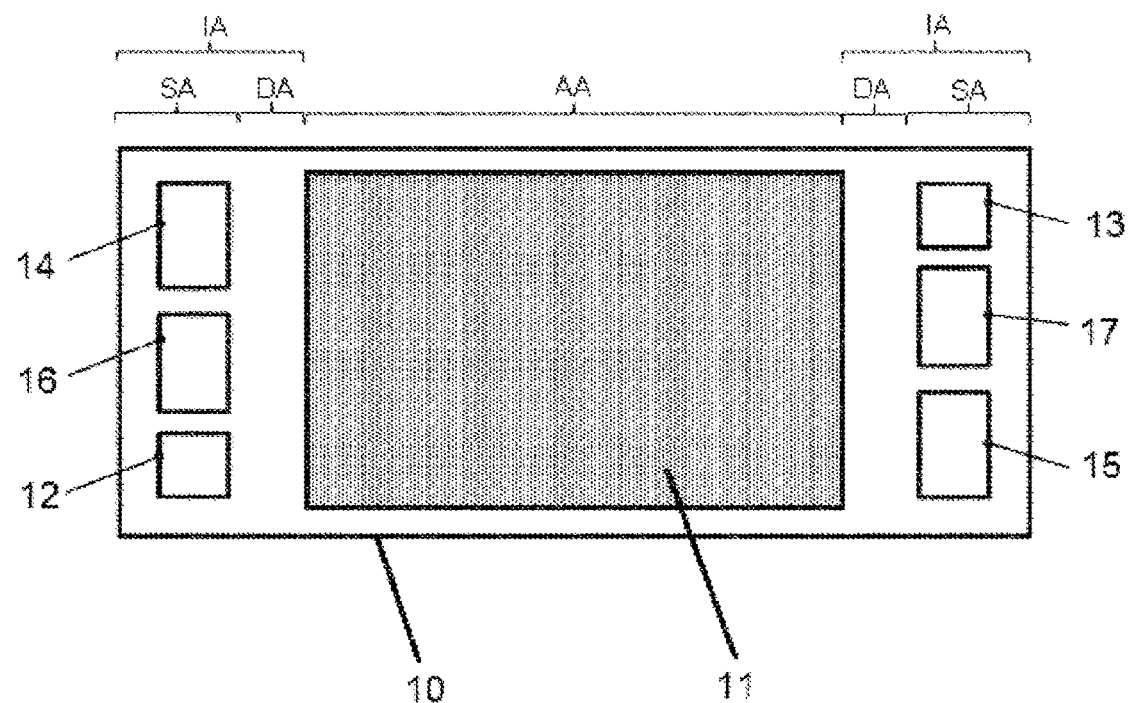
FIG. 1 is a plan view of a bipolar plate with a membrane electrode unit arranged thereon.

FIG. 1 shows a bipolar plate 10 with an MEA 11 arranged thereon.

Both components are divided into an active area AA and an inactive area IA. The active area AA is characterized in that the fuel cell reactions take place in this area. The inactive areas IA can respectively be divided into supply areas SA and distributor areas DA. Within the supply areas SA, supply openings 12 through 17 are arranged, which, in the stacked state, substantially align with one another and form main supply channels within a fuel-cell stack (not shown). The anode inlet opening 12 serves to supply the anode operating gas, i.e., the fuel, e.g., hydrogen. The anode outlet opening 13 serves to discharge the anode exhaust gas after it flows across the active area AA. The cathode inlet opening 14 serves to supply the cathode operating gas, which is, in particular, oxygen or an oxygen-containing mixture, such as air. The cathode outlet opening 15 serves to discharge the cathode exhaust gas after it flows across the active area AA. The coolant inlet opening 16 serves to supply and the coolant outlet opening 17 serves to discharge the coolant.

Figure 2:
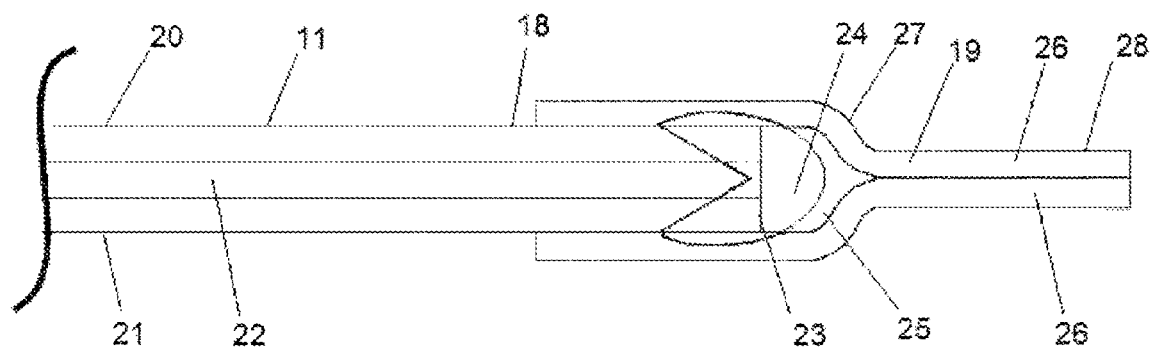
FIG. 2 is a sectional partial view of an edge region of an MEA in a sealing frame.

FIG. 2 shows the edge region 18 of an MEA 11 in a sealing frame 19. The MEA 11 consists of a polymer electrolyte membrane 22 arranged between two gas diffusion layers 20, 21.

On the edge region 23 of the MEA 11, a seal 24 is provided which surrounds the edge region 23. In addition, the edge region 18 is surrounded by the sealing frame 19, which forms a cavity 25, which is at least partially filled by the seal 24, at the edge region 23 of the MEA 11. The cavity 25 may prevent, even in the case of other embodiments of the sealing frame 19, the elastomer of the seal 24 compressed later in the stacking direction from having any expansion space and the contact force distribution from then becoming unfavorable. In FIG. 2, and also in the subsequent figures, the seal 24 is shown only schematically. This seal is limited by the frame 19. The sealing frame 19 consists of two equally shaped frame parts 26 which are connected to one another and form in the connection area 27 a circumferential edge 28 which extends away from the MEA 11. The frame parts 26 may be formed by means of plastic films.

Figure 3:
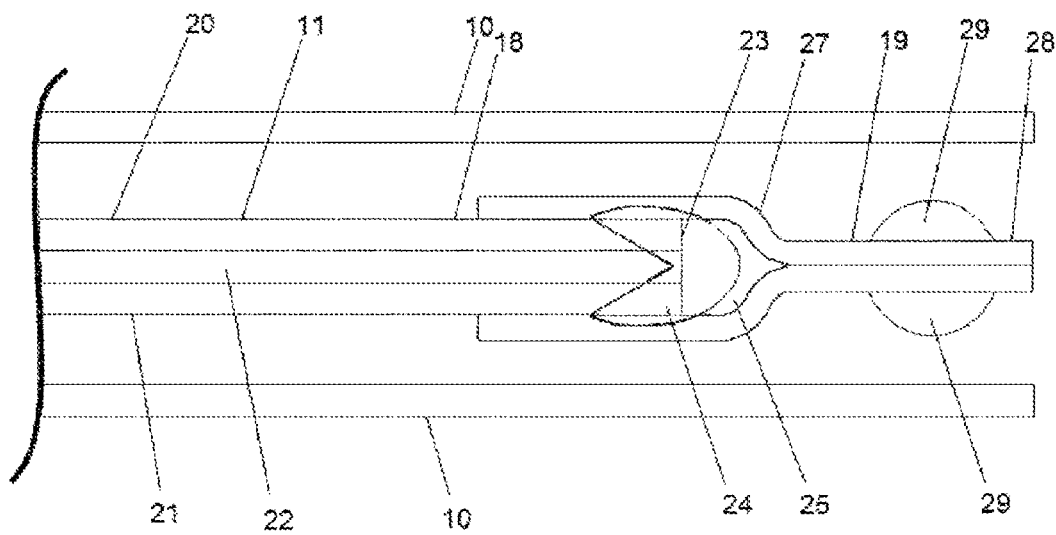
FIG. 3 is a sectional partial view of an edge region of the MEA in a sealing frame according to FIG. 2 between two separator plates.
Figure 4:
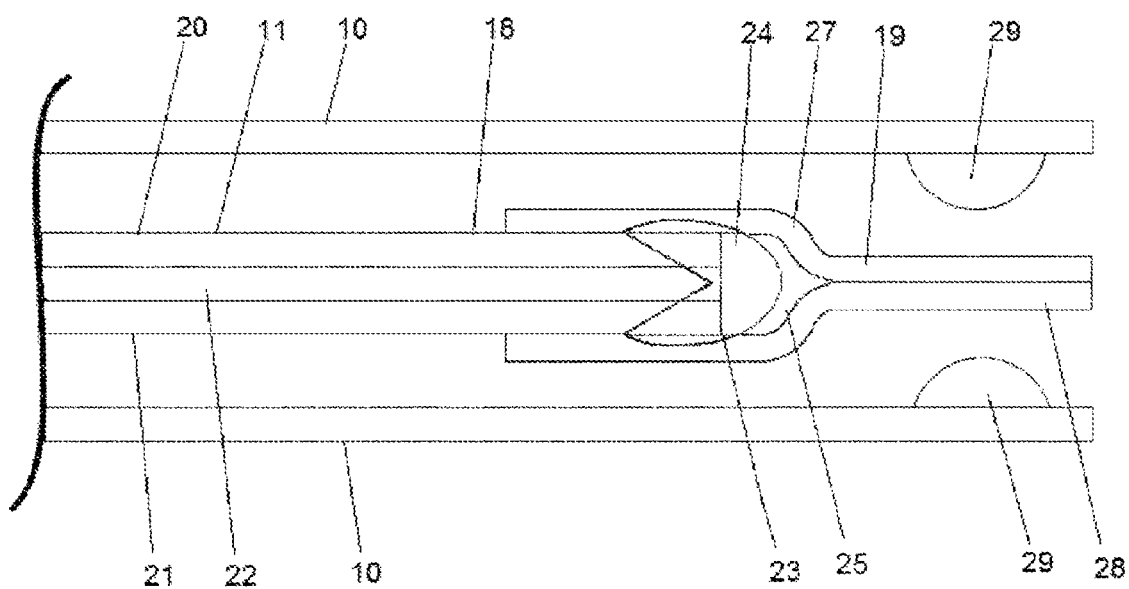
FIG. 4 is a sectional partial view of an edge region of the MEA in a sealing frame according to FIG. 2 between two separator plates according to another embodiment.

In FIGS. 3 and 4, the same embodiment of the MEA 11 with a sealing frame 19 is illustrated, wherein a separator plate 10 is respectively arranged on both sides of the MEA 11. In FIG. 3, a seal 29 which seals the gas chambers is arranged on both sides of the circumferential edge 28. In the embodiment of FIG. 4, the seals 29 are respectively provided on the separator plates 10 corresponding to the circumferential edge 28 of the sealing frame 19.

Figure 5:
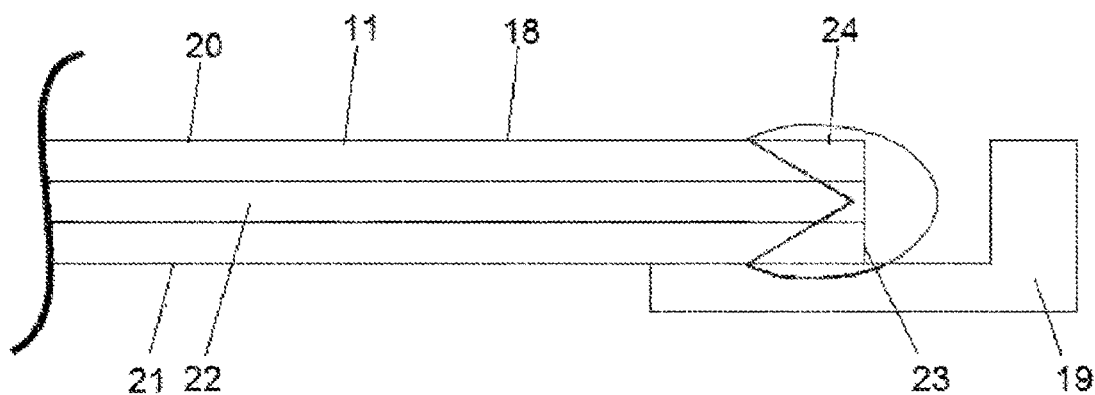
FIG. 5 is a sectional partial view of an edge region of an MEA with a variation of the sealing frame.

FIG. 5 shows an MEA 11 with a one-piece sealing frame 19 with an L-shaped cross-sectional profile so that the MEA 11 can be simply inserted into the sealing frame 19 during assembly and optionally fixed. This sealing frame 19 can itself consist of a sealing material or can be provided with at least one seal, such as on both sides.

Figure 6:
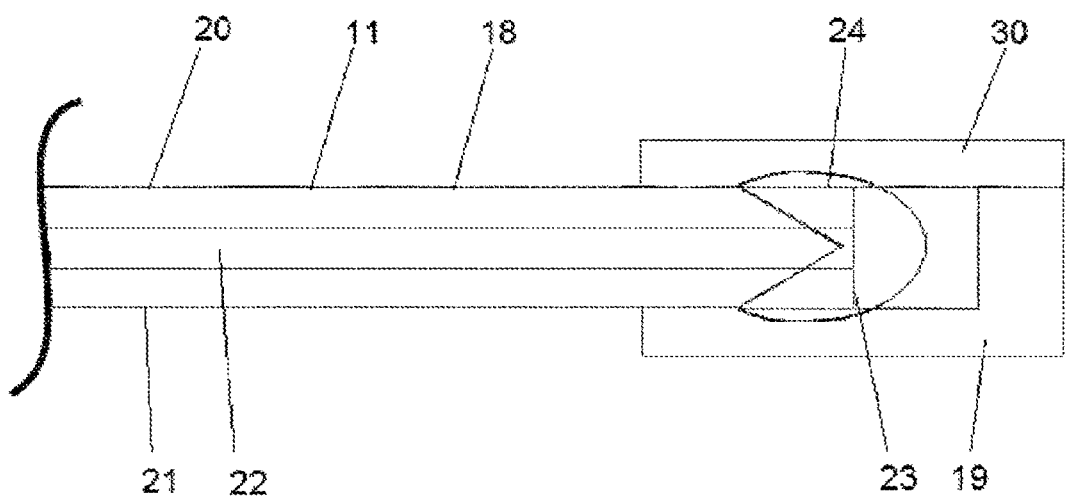
FIG. 6 is a sectional partial view of an edge region of an MEA with a further variation of the sealing frame.

Based upon the variant of the one-piece sealing frame 19 shown in FIG. 5, the MEA 11 is introduced in FIG. 6 into a sealing frame 19 which is closed by a frame part 30 so that the sealing frame 19 has a U-shaped cross-sectional profile overall.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:
a membrane electrode unit;
a first seal arranged on an edge region of the membrane electrode unit, wherein a first part of the first seal penetrates into the edge region of the membrane electrode unit and a second part of the first seal fully covers the edge region outside the membrane electrode unit, wherein the second part of the first seal extends continuously from a first major surface of the membrane electrode unit to a second major surface of the membrane electrode unit opposite to the first major surface and surrounds the edge region of the membrane electrode unit on both of the first and second major surfaces of the membrane electrode unit;
a sealing frame that, together with the first seal, extends from the first major surface of the membrane electrode unit to the second major surface of the membrane electrode unit and surrounds the edge region of the membrane electrode unit on both of the first and second major surfaces of the membrane electrode unit, wherein the sealing frame includes a first sealing frame component having an L-shaped cross-sectional profile and a second sealing frame component having a rectangular-shaped cross-sectional profile such that, when the fuel cell stack is assembled, the sealing frame has an overall U-shaped cross-sectional profile, and wherein the sealing frame has a circumferential edge which extends away from the membrane electrode unit in a plane of the membrane electrode unit; and
a second seal arranged on the circumferential edge of the sealing frame, wherein the second seal seals the circumferential edge of the sealing frame to a separator plate.

2. The system according to claim 1, wherein the first seal penetrates 0.1 to 1 mm into the membrane electrode unit and/or surrounds the edge region on both sides of the membrane electrode unit by 0.1 to 1 mm.

3. The system according to claim 1, wherein the sealing frame consists of a polymer.

4. The system according to claim 1, wherein the first seal consists of a polymeric material.

5. A fuel cell system comprising:
a membrane electrode unit;
a seal arranged on an edge region of the membrane electrode unit, wherein a first part of the seal penetrates into the edge region of the membrane electrode unit and a second part of the seal fully covers the edge region outside the membrane electrode unit, wherein the second part of the seal extends continuously from a first major surface of the membrane electrode unit to a second major surface of the membrane electrode unit opposite to the first major surface and surrounds the edge region of the membrane electrode unit on both of the first and second major surfaces of the membrane electrode unit; and
a sealing frame that, together with the seal, extends from the first major surface of the membrane electrode unit to the second major surface of the membrane electrode unit and surrounds the edge region of the membrane electrode unit on both of the first and second major surfaces of the membrane electrode unit, wherein the sealing frame includes a first sealing frame component having an L-shaped cross-sectional profile and a second sealing frame component having a rectangular-shaped cross-sectional profile such that, when the fuel cell system is assembled, the sealing frame has an overall U-shaped cross-sectional profile.

6. A fuel-cell stack comprising:
a plurality of fuel cells, each of the fuel cells including:
bipolar plates; and
a membrane electrode unit, the membrane electrode unit including:
a seal arranged on an edge region of the membrane electrode unit, wherein a first part of the seal penetrates into the edge region of the membrane electrode unit and a second part of the seal fully covers the edge region outside the membrane electrode unit, wherein the second part of the seal extends continuously from a first major surface of the membrane electrode unit to a second major surface of the membrane electrode unit opposite to the first major surface and surrounds the edge region of the membrane electrode unit on both of the first and second major surfaces of the membrane electrode unit; and
a sealing frame that, together with the seal, extends from the first major surface of the membrane electrode unit to the second major surface of the membrane electrode unit and surrounds the edge region of the membrane electrode unit on both of the first and second major surfaces of the membrane electrode unit, wherein the sealing frame includes a first sealing frame component having an L-shaped cross-sectional profile and a second sealing frame component having a rectangular-shaped cross-sectional profile such that, when the fuel cell stack is assembled, the sealing frame has an overall U-shaped cross-sectional profile.

7. The fuel-cell stack according to claim 6, wherein the seal is a first seal and the bipolar plates have on both sides a second seal which corresponds to the sealing frame of the adjacent membrane electrode units and seals the respective bipolar plate to the sealing frame.

8. The system according to claim 1, wherein the first seal penetrates 0.2 to 0.7 mm into the membrane electrode unit and/or surrounds the edge region on both sides of the membrane electrode unit by 0.2 to 0.7 mm.

9. The system according to claim 1, wherein the first seal penetrates 0.4 to 0.6 mm into the membrane electrode unit and/or surrounds the edge region on both sides of the membrane electrode unit by 0.4 to 0.6 mm.

10. The system according to claim 1, wherein the first seal penetrates 0.5 mm into the membrane electrode unit and/or surrounds the edge region on both sides of the membrane electrode unit by 0.5 mm.

11. The system according to claim 1, wherein the first seal consists of a silicone.

* * * * *